Patented Mar. 20, 1923.

1,449,113

UNITED STATES PATENT OFFICE.

FRIEDRICH HAYDUCK, OF WILMERSDORF, GERMANY, ASSIGNOR TO THE FLEISCH-MANN COMPANY, OF NEW YORK, N. Y., A CORPORATION OF OHIO.

METHOD FOR THE PRECIPITATION AND PREPARATION OF COMPRESSED YEAST.

No Drawing.   Application filed October 30, 1920.   Serial No. 420,840.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Methods for the Precipitation and Preparation of Compressed Yeast (for which application for patent was filed in Germany, June 26, 1915, Patent No. 300,664), of which the following is a specification.

This invention relates to a method of settling and separating yeast from the liquid in which it has been propagated and has for its object an improved procedure for rapidly, efficiently and economically achieving this result.

Another object is to provide a method of preparing yeast in a marketable condition which is convenient and economical.

At the time that the processes of the manufacture of aerated yeast had not yet reached their present volume, it was customary to separate the yeast from the spent wort by allowing the yeast to settle in a suitable precipitation vat, and thereafter pressing it to release it from the adhering liquid. It was observed, however, that the lower the degree of acidity of the liquid in which the yeast was grown the more perfect was the flocculation and settling or precipitating of the yeast. However, since the biological purity of the yeast is impaired by the long stay during settling or precipitation in liquids having low acidity, centrifugals (separators) were employed which made it possible to free even pulverulent yeast quickly from the fermented or spent wort.

I have now ascertained that it is possible fully and quickly to precipitate even a completely pulverulent (dusty) yeast from the fermented or spent wort by adding to the same, after the end of the propagating period, alkalies (e. g. soda lye, soda, lime water, etc.) until a weakly alkaline reaction is produced. As a result of this the yeast will conglomerate and will then settle or precipitate from the wort, whereby it will be possible to draw off the clear supernatant liquid from the settled yeast.

As an example of the manner in which this method may be carried out the following is given:

The yeast may be grown in a wort of any suitable composition (e. g. grain worts, sugar-salt worts, molasses worts, worts prepared from industrial waste liquors, etc.) in accordance with the usual methods of manufacture. As soon as the period of propagation is completed the yeast is settled either in the fermentation vat itself or in a suitable settling vat, by the addition of alkali. The quantity of alkali which need be employed is very small. For example, in worts of neutral reaction the addition of from 5 to 10 grams of caustic soda per hectoliter of yeast containing liquid is sufficient. From a solution which has been so treated yeast will settle in a short time, for example, within ten minutes. The supernatant liquid is then removed and the yeast in the remaining liquid may be acidified by the addition of a small amount of mineral acid prior to pressing in order to avoid infections.

Having described my invention, what I claim as new and desire to secure by Letters Patent is:—

1. A method of settling yeast from a liquid in which it is suspended which comprises rendering the liquid slightly alkaline.

2. A method of settling yeast from a liquid in which it is suspended which comprises rendering the liquid slightly alkaline by the addition of a substance having an alkaline reaction.

3. A method of settling yeast from a liquid in which it is suspended which comprises rendering the liquid slightly alkaline by the addition of an alkali.

4. A method of settling yeast from a liquid in which it is suspended which comprises inducing precipitation and settling by the addition of caustic soda.

5. The method of settling yeast from residual liquid nutrient solutions used in the manufacture of yeast by the aeration process and after termination of the period of propagation, which comprises adding an alkali to the yeast containing solution until a weakly alkaline reaction is produced.

6. The method of separating yeast from the excess of spent wort in which it has been propagated which comprises rendering the wort slightly alkaline by the addition of an alkali, allowing the yeast to settle, and withdrawing the supernatant liquid.

7. In a method of preparing compressed yeast, the steps which comprise separating the yeast from the spent wort in which it has been propagated, by the addition of an alkali until a weakly alkaline reaction is produced, allowing the yeast to settle, withdrawing the supernatant liquid, rendering the residual liquid in which the yeast is suspended slightly acid by the addition of a mineral acid, and subjecting the suspension to the action of a filter press.

In testimony whereof, I have affixed my signature.

FRIEDRICH HAYDUCK.